April 28, 1959
C. H. LEATHERS ET AL
2,883,693
PIPE WIPER
Filed March 28, 1955
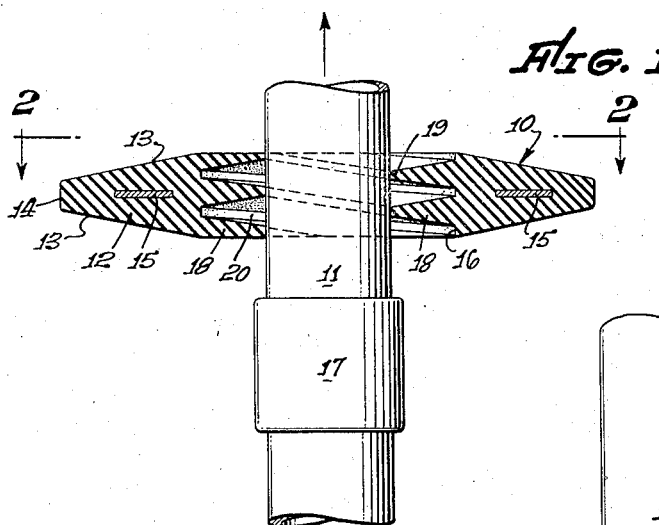
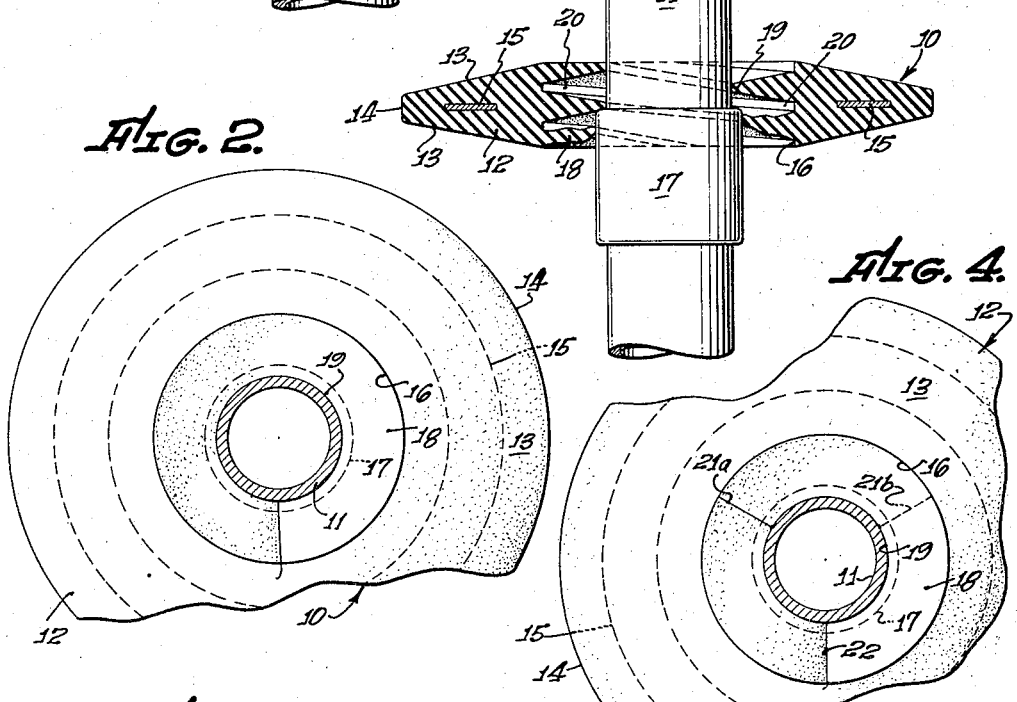
CLARENCE H. LEATHERS,
ROY K. SHELLMAN,
INVENTORS.
BY *Healvin White*
ATTORNEY.

United States Patent Office 2,883,693
Patented Apr. 28, 1959

2,883,693
PIPE WIPER

Clarence H. Leathers, Redondo Beach, and Roy K. Shellman Compton, Calif., assignors to MacClatchie Manufacturing Company, Compton, Calif., a corporation of California Application March 28, 1955, Serial No. 497,023

6 Claims. (Cl. 15—210)

This invention relates to pipe wiping or cleaning devices of the type used in connection with oil well pipe pulling operations to wipe the external cylindrical surface of pipe as it is withdrawn from a well, thereby removing foreign material from the pipe surface, and more particularly has to do with an improved device of this type capable of maintaining circumferential wiping contact with the surface of the pipe or a pipe collar or coupling of enlarged diametral dimension, without damage to the wiper.

In recent years the use of pipe wiping devices in oil field operations for removing foreign material from the external surfaces of pipe sections has become quite general. The practice has been to pass the pipe through a hole in an elastomeric body, the hole having a diameter slightly less than the pipe in order to secure edge contact with the surface of the pipe, and the thickness of the body being great enough to preclude rupture thereof during bending displacement in the direction of pipe travel. Such bending displacement is necessary to allow passage through the hole of pipe couplings having diameters substantially larger than that of the pipe, the circumferential edge of the wiper defining the hole being enlarged all at once when it is displaced in the direction of pipe withdrawal, with that portion of the elastomeric body surrounding the hole being subjected to stretching. Experience has shown that pipe wipers formed to have such a construction are subject to rapid wear and deterioration due to excessive stretching and pulling of the relatively thick elastomeric body and wearing at the wiping edge thereof caused by sudden annular engagement of the ends of pipe couplings against the complete annular extent of the wiping edge, and leading to undesirably decreased wiper life.

The present invention has for its primary purpose the provision of an improved pipe wiper characterized by increased ability to flex in the direction of pipe withdrawal as well as to expand radially in order to better accommodate the passing of pipe couplings or collars through the wiper aperture, all without sacrificing the effectiveness of the pipe surface scraping or wiping function of the device. In addition, the wiper is so constructed as to impart increased useful life thereto while maintaining its wiping efficiency.

In accordance with the invention, the pipe engaging surfaces or lips of the wiper are formed to have a spiral configuration resembling a screw thread, and preferably but not necessarily including at least two full turns. Extending intermediate the pipe engaging surfaces in an axial sense is a continuous spiral recess running between the upper and lower surfaces of the wiper, and serving to receive loose foreign material removed from the pipe surface by the spiral wiper edge, such material usually including mud or other fluids which tend to flow downward in the spiral recess after their removal from the pipe.

The pipe surface engaging portions of the wiper are formed to have relatively decreased thickness in section allowing greater flexibility thereof in the direction of pipe withdrawal and being capable of a certain degree of radial expansion to better accommodate the withdrawal of a pipe coupling through the wiper. Furthermore, the spiral configuration of the flexible wiper edge has the considerable advantage of providing for progressive edge contact with the surface of a pipe collar in a leading or axially running sense, adding materially to the ability of the wiping edge to deflect in the direction of pipe withdrawal and to "ride up" onto the surface of a pipe collar passing through the aperture, as opposed to the action of a conventional ring-shaped edge.

The invention also contemplates the provision of radial slits formed in the pipe wiping thread at angularly spaced locations around the axis of the pipe receiving aperture to give greater bending flexibility to the wiper edge for better accommodating withdrawal of pipe couplings through the wiper. Such slits are desirably formed at angular intervals such that the surface portion of the pipe moving past a slit will also be wiped by a preceding or following wiper edge portion, in order not to leave any streaks of foreign material on the pipe surface. When the pipe contacting edge of the wiper is formed in substantially two full turns, the slits may be spaced at 240° intervals therealong.

Other features and objects of the invention, as well as the details of an illustrative embodiment, will appear more fully understood from the following description of the accompanying drawings, in which:

Fig. 1 is a sectional view taken in elevation of the pipe wiper showing a pipe passing through the wiper;

Fig. 2 is a section taken on line 2—2 of Fig. 1;

Fig. 3 is a view similar to Fig. 1 and showing a pipe collar passing through the wiper;

Fig. 4 is a view similar to Fig. 2 and showing a slightly modified form of the pipe wiper; and Fig. 5 is a sectional view taken in elevation of another form of the invention.

As shown in Fig. 1, the improved pipe wiper 10 comprises an elastomeric body formed to extend generally transversely relative to the direction of travel of a pipe 11 through the wiper. Body 10 may be conveniently shaped in annular form; however, it will be understood that other body shapes may be used consistent with the particular advantages and benefits deriving from the inventive concepts embodied in the wiper.

Wiper body 10 includes an elastomeric annular outer section 12 having tapered top and bottom surfaces 13 and an outer side 14 conveniently defining a trapezoidal cross-section in order to save material. For stiffening purposes, a suitable annular metal support such as ring 15 may be embedded in the section 12 during molding thereof.

The elastomeric body is provided with a central opening 16 extending vertically between top and bottom surfaces of the body, and a thread-like spiral projection 18 extends laterally inwardly from the wall of opening 16 toward the axis of the central opening. Projection 18 terminates inwardly in a spiral edge portion 19 curving around the axis of opening 16 for at least 360° and preferably substantially two full turns around that axis, as shown in Fig. 1. In other words, edge portion 19 advances axially in a spiral direction between the top and bottom surfaces of the elastomeric body.

Located between successive turns of spiral projection 18 is a continuous recess 20 also curving around the axis of opening 16 between the top and bottom surfaces of the elastomeric body, the recess having a depth defined by the lateral dimension of projection 18 between the wall of opening 16 and the inner edge 19 of the projection. While the cross-section of the continuous spiral projection 18 is shown to be tapered toward the axis of opening 16, it will be understood that various other cross-section shapes may be used consistent with desired flexing and expanding characteristics of continuous edge portion 19, as will be described. One condition imposed upon the lateral dimension of projection 18 requires that the edge portion 19 be in circumferentially continuous contact with the external surface of each pipe section 11 as it is drawn through the aperture 16 in an axial direction, in order that foreign material on the surface of the pipe section such as mud and small particles carried thereby may be wiped off the pipe surface. For this purpose, the radius of edge portion 19 is preferably slightly less than that of pipe 11.

In operation, pipe is drawn through the wiper which may be suitably held against upward displacement as by engagement with the master bushing, not shown. The wiping action described above takes place with edge portion 19 in spiral contact with the pipe surface, changes in diametral dimension of the pipe sections relative to the axis of opening 16, such as are embodied in pipe couplings or collars 17, being readily absorbed or taken in compression by the spiral projection 18, as illustrated in Fig. 3. More importantly, the thickness dimension of the projection 18 being reduced relative to similar dimensions found in conventional circular pipe wipers, deflection of spiral edge portion 19 in the direction of pipe travel and into spiral recess 20 resulting from interference contact with coupling 17, as well as expansion of projection 18 in a lateral direction also resulting from such interference, are more readily accommodated.

The spiral shape of the pipe wiping edge portion 19 and the recess structure 20 between successive turns of projection 18 find particular advantage in accommodating passage of an enlarged diameter collar or coupling 17 through the pipe wiper by reason of progressive engagement of edge 19 with the surface of the collar. As will be seen in Fig. 3 entrance of the collar 17 into the aperture 16 is accompanied by spreading and flexing of the spiral projection 18 as the edge portion 19 thereof rides up onto the surface of the collar. The latter action takes place not all at once as in prior circular pipe wipers, but in a progressive sense, in that the edge portion 19 comes into contact with the collar surface 17 at successive points around the spiral, so that spreading and flexing of projection 18 proceeds incrementally and continuously over the length of the spiral edge portion from the lower toward the upper surface of the wiper. For this reason, wear and deterioration of the pipe wiper edge portion 19 is substantially reduced by reason of diminished stretching and pulling of the edge portion 19 and adjacent areas of the elastomeric body 10 upon engagement with pipe collars. At the same time, fluid materials removed from the surfaces of the pipe or collars tend to drain downward in recess 20 under the influence of gravity for subsequent discharge away from the bottom of the wiper.

The modified pipe wiper shown in Fig. 4 includes a plurality of radial slits 21 formed in projection 18 at spaced locations around the axis of opening 16 in such manner that the surface portion of the pipe moving past any slit will be wiped by a preceding or following continuous wiper edge portion, in order not to leave any streaks of foreign material on the pipe surface. The slits 21 provide for increased flexibility of the spiral projection 18 in an axial direction and thus better accommodate passage of collars 17 through the wiper as described above.

Since the slits 21 are necessarily formed in projection 18 at 360° intervals from continuous sections of edge portions 19, the spiral extent of projection 18 must be greater than 360°. When the wiper edge 19 is formed to have substantially two full turns as shown in Fig. 1, the slits may be spaced at equal 240° intervals around the axis of opening 16, as measured from the intersection 22 of the surface of projection 18 with the top or bottom surface of body 10. As shown in Fig. 4, slit 21a is positioned at a 240° interval from intersection 22 in a counterclockwise sense, and the second slit 21b is likewise positioned at a 240° interval from slit 21a.

The modified wiper shown in Fig. 5 includes a spiral shaped elastomeric body 25 having a central pipe receiving aperture 26, around which the convolutions 27 the body extend for at least 360° and preferably about two full turns or 720°. In section, each convolution 27 extends from the inner spiral shaped pipe wiping edge 28 thereof radially outward to an outer edge 29 such that the distance between inner and outer edges 28 and 29 is at least as great as the diameter of aperture 26, and preferably somewhat greater in order to impart desired axial flexibility to the convolutions. The thickness dimension between top and bottom surfaces 30 of each convolution is considerably less than its lateral extent for similar reasons.

Resiliently holding the convolutions of body 25 in normal axial separation is a spiral metal spring 31 preferably, though not necessarily, embedded in the outer portions of the convolutions. Spring 31 has a sufficiently stiff construction to resist extreme axial displacement of the convolutions during pipe wiping, while accommodating such displacement therebetween as tends to occur upon passage of enlarged collars or couplings through the wiper, such action being characterized by improved flexibility of engagement of the spiral wiping edge 28 with pipe sections and collars, with concomitant decreased wear and tear of the wiper in use. Engagement of wiping edge 28 with pipe and collars takes place substantially as described in connection with Fig. 3.

We claim:

1. A wiper for cleaning a well pipe string having enlarged joint portions and intermediate reduced diameter portions, comprising a body formed of elastomeric material and containing a vertically and axially extending opening for passing said pipe string upwardly through said body as the string is withdrawn upwardly from a well, said body having a radially inner portion forming a lip for engaging said pipe, said lip having upper and lower exposed free ends and curving essentially helically more than 360° about said axis and throughout the lip extent between its exposed free ends to wipe foreign material from the upwardly moving pipe about its entire periphery, said body having a radially outer annular portion positioned outwardly of and carrying said inner helical lip, the elastomeric material of said inner helical lip being substantially thinner axially than is said radially outer annular portion of the body and being thin enough to allow elastic expansion of the lip without corresponding expansion of said outer portion and between a constricted condition for engaging and wiping said reduced diameter portions of the pipe and an expanded condition for engaging and wiping said enlarged joint portions, said outer annular portions of said body having a continuous surface extending the entire length of the helical wiping lip.

2. A wiper as recited in claim 1, in which said essentially helical lip tapers radially inwardly as it projects inwardly from said outer portion of the body.

3. A wiper as recited in claim 1, including a reinforcing ring of a material stiffer than said body and embedded in said radially outer portion thereof.

4. A wiper as recited in claim 1, in which said lip portion of the body has at least one radial slit formed therein for allowing relative displacement of adjacent portions of the lip.

5. A wiper for cleaning a well pipe string having enlarged joint portions and intermediate reduced diameter portions, comprising a body formed of elastomeric material and containing a vertically and axially extending opening for passing said pipe string upwardly through said body as the string is withdrawn upwardly from a well, said body having a maximum axial thickness which is small as compared with its width transversely of the pipe axis, said body having a radially inner portion forming a lip for engaging said pipe, said lip having upper and lower exposed free ends and curving essentially helically more than 360° about said axis and throughout the lip extent between its exposed free ends to wipe foreign material from the upwardly moving pipe about its entire periphery, said body having an essentially annular radially outer portion positioned outwardly of and carrying said inner helical lip, the elastomeric material of said inner helical lip being substantially thinner axially than is said radially outer portion of the body and being thin enough to allow elastic expansion of the lip without corresponding expansion of said outer portion of the body and between a constricted condition for engaging and wiping said reduced diameter portions of the pipe and an expanded condition for engaging and wiping said enlarged joint portions, said lip being tapered radially inwardly to a reduced thickness inner wiping edge, said outer annular portions of said body having a continuous surface extending the entire length of the helical wiping lip.

6. A wiper as recited in claim 5, including a reinforcing ring embedded in said radially outer portion of said body, said lip portion of the body having at least one radial slit formed therein for allowing relative displacement of adjacent portions of the lip, and said helical lip extending for at least about two complete turns about the pipe.

References Cited in the file of this patent

UNITED STATES PATENTS

| | | |
|---|---|---|
| 2,446,380 | Meyers et al. | Aug. 3, 1948 |
| 2,568,247 | Medearis | Sept. 18, 1951 |
| 2,611,146 | Buckley | Sept. 23, 1952 |
| 2,620,504 | Slater | Dec. 9, 1952 |
| 2,657,414 | Miller et al. | Nov. 3, 1953 |